United States Patent [19]

Buckendahl

[11] Patent Number: 5,577,586
[45] Date of Patent: Nov. 26, 1996

[54] OVERRUNNING CLUTCH WITH LUBRICANT RETAINER

[76] Inventor: Robert A. Buckendahl, 780 Miller Dr., Fort Dodge, Iowa 50501

[21] Appl. No.: 427,745

[22] Filed: Apr. 24, 1995

[51] Int. Cl.$^6$ .................................. F16D 41/07
[52] U.S. Cl. ................ 192/45.1; 192/41 A; 192/113.32
[58] Field of Search .................. 192/41 A, 45.1, 192/113.32

[56] References Cited

U.S. PATENT DOCUMENTS

| | | | |
|---|---|---|---|
| 2,834,445 | 5/1958 | Gorsky | 192/45.1 |
| 4,494,636 | 1/1985 | Wakabayashi | 192/41 A |
| 4,875,564 | 10/1989 | Leitz et al. | 192/45.1 |
| 4,913,271 | 4/1990 | Kinoshita et al. | 192/113.32 X |
| 5,320,204 | 6/1994 | Riggle et al. | 192/45.1 |

*Primary Examiner*—Richard M. Lorence
*Attorney, Agent, or Firm*—G. Brian Pingel; Brett J. Trout

[57] ABSTRACT

An overrunning clutch having structure capable of maintaining a lubricant within the overrunning clutch during operation. The overrunning clutch is provided with an outer race and an inner race with a sprag assembly positioned therebetween. The sprag assembly is provided with sidewalls which substantially prevent the escape of lubricant between the sprag assembly and the outer race. The overrunning clutch is also provided with thrust washers which substantially prevent the escape of the lubricant between the thrust washers and the outer race, while allowing injection of a lubricant through the thrust washer and over the sidewalls of the sprag assembly to lubricate the sprags during operation of the overrunning clutch.

4 Claims, 3 Drawing Sheets

OVERRUNNING CLUTCH WITH LUBRICANT RETAINER

BACKGROUND OF THE INVENTION

1. Field of the Invention

The present invention relates generally to a clutch apparatus for allowing rotation of a first race member in a first direction relative to a second race member, while preventing rotation of the first race member in a second direction relative to the second race member and, more specifically, to an overrunning clutch apparatus for maintaining lubricant in contact with a unidirectional drive means located between the first race member and the second race member.

2. Description of the Prior Art

Overrunning clutches typically have an interior race keyed to a shaft or other drive mechanism and an exterior race concentrically located around the inner race with an annular space therebetween. Provided within the annular space is a unidirectional drive means which transmits torque between the races when one of the races is rotated in a first direction relative to the other, but which does not transmit torque when the race is rotated in the opposite direction.

One type of overrunning clutch, a sprag clutch, has a unidirectional drive means comprising a plurality of asymmetrical tumblers or sprags provided within a retainer. When one race is rotated in a first direction relative to the other, the sprags are biased into an upright position by springs or similar resilient means. Because the sprags are too large to move fully upright, they jam or wedge between the races, thereby transmitting torque between the races. When the race is rotated in the opposite direction, the sprags are tilted sideways into an overrunning position, so that no torque is transmitted between the races.

Even when the sprags are in their overrunning position, the spring still biases the tips of the sprags into contact with both races. Although little or no torque is transmitted between the races when the sprags are in the overrunning position, the high speeds of the races relative to the sprags causes a constant wearing between the sprags and the races. Without adequate lubrication, this wearing between the sprags and races would quickly deteriorate the sprags. Constant lubrication is therefor imperative.

Many prior art designs have been suggested for maintaining lubrication on the sprags to alleviate premature wear when the clutch is in the overrunning position. U.S. Pat. No. 4,875,564 Leitz, et al. discloses one embodiment of a sprag assembly which includes an outer sprag cage ring, an inner sprag cage ring, and a pair of lateral disks enclosing the sprags and preventing undesirable lateral displacement of the sprags. The lateral disks may be provided with bores which allow the introduction of oil into contact with the sprags to reduce wear and friction.

In this invention, however, the placement of the inner sprag cage ring prevents the lateral introduction of a lubricant near the innermost portions of the sprags. Any lubricant induction bores must be generally centered between the outer and inner circumferences of the lateral disks. This centering of the bores, combined with the centrifugal force of the rotating clutch, prevents the innermost portions of the sprags from being fully lubricated. The centering of the bores also allows a lubricant to escape from the sprags back through the bores. Additional escape of lubricant is provided by holes used to connect the outer sprag cage ring to the lateral disks.

It would therefor be desirable to eliminate the outer cage ring connection holes and to provide a bore closer to the inner race. In this way, lubricant could be supplied to the innermost portions of the sprags, while reducing escape of the lubricant through the bores. Additionally, it would be desirable to provide means for retaining excess lubricant within the space between the inner race and outer race, even if the lubricant were to become inadvertently expelled from the sprag retainer.

The difficulties encountered in the prior art discussed hereinabove are substantially eliminated by the present invention.

SUMMARY OF THE INVENTION

By the present invention it is proposed to overcome the difficulties encountered heretofore. To this end, an overrunning clutch is provided. The overrunning clutch comprises an inner race having an outer annular contact surface and a central axis of rotation, as well as an outer race having an inner annular contact surface spaced radially from the inner race. The inner annular contact surface and outer annular contact surface form an annular space therebetween. A plurality of sprags are provided in the annular space to allow the inner race to rotate in a first direction relative to the outer race, while preventing the inner race from rotating in an opposite direction relative to the outer race. Sprag retainer means are also provided in the annular space for maintaining the sprags in the annular space. A washer means is positioned over the annular space for substantially preventing escape of a lubricant from the annular space between the washer means and the outer race. The washer means is provided with structure which forms an opening to the annular space when the washer means is positioned over the annular space.

Preferably, the sprag retainer means is provided with walls which extend over greater than fifty percent of the area between the inner race and outer race. The walls are of a construction which provides an annular space between the walls and the inner race to allow the even introduction of the lubricant to the plurality of sprags. The washer means is preferably a thrust washer provided between the inner race and outer race to substantially prevent the escape of lubricant out of the annular space. The thrust washer is preferably provided with a plurality of slots to allow the introduction of the lubricant between the thrust washer and the inner race when the overrunning clutch is assembled.

DETAILED DESCRIPTION OF THE PREFERRED EMBODIMENT

Figure 1:
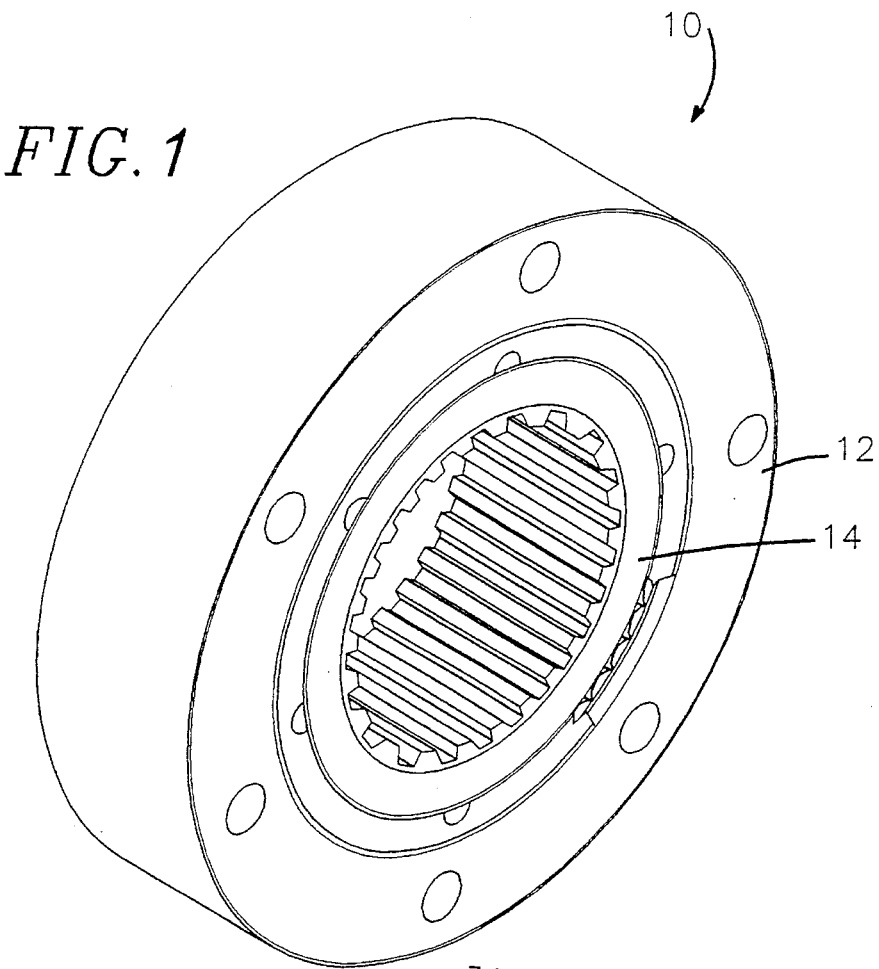
FIG. 1 is a perspective view of the overrunning clutch of the present invention.

There is shown in the figures an overrunning clutch 10 having a sprag assembly 24 positioned between an inner race 14 and an outer race 12. The sprag assembly 24 is provided with a sprag retainer 26 which extends over greater than fifty percent of the area between the inner race 14 and the outer race 12 to reduce the escape of a lubricant from the sprag assembly 24. The sprag retainer 26 of the sprag assembly 24 is provided close enough to the outer race 12 to substantially prevent escape of the lubricant between the sprag retainer 26 and the outer race 12. Additionally, thrust washers 40 are provided over the sprag assembly 24 between the inner race 14 and the outer race 12 to further reduce the escape of the lubricant from the overrunning clutch 10. The thrust washers 40 are also provided with a plurality of slots 46 to allow the introduction of additional lubricant into the sprag assembly 24.

Figure 5:
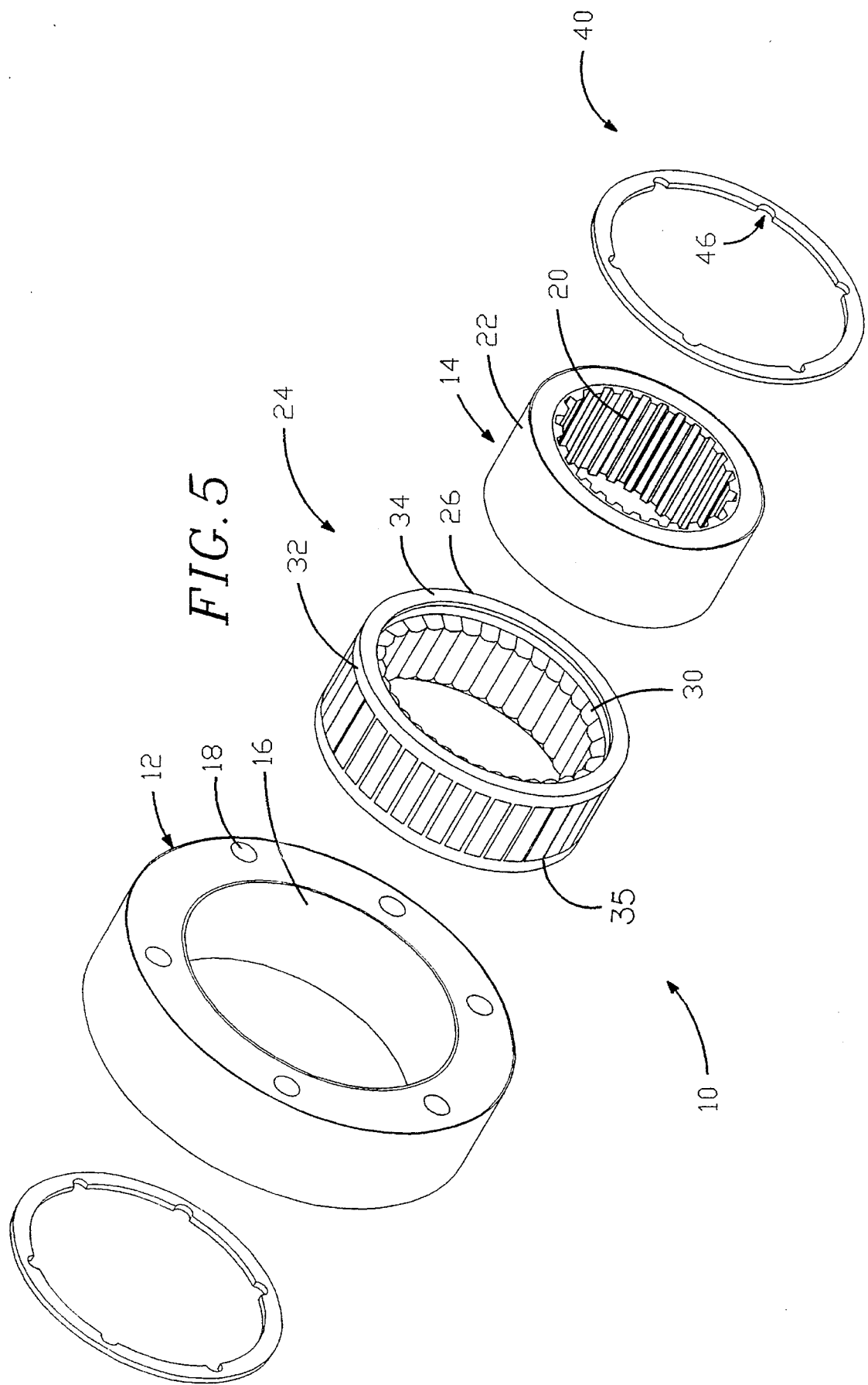
FIG. 5 is an exploded view of the overrunning clutch of FIG. 1.

In FIG. 1, there is shown an overrunning clutch 10 having an outer race 12 and an inner race 14. Both the outer race 12 and inner race 14 are preferably constructed of hardened steel to increase the longevity of the overrunning clutch 10. The outer race 12 is provided with an inner annular contact surface 16 (FIG. 5). The outer race 12 is also provided with a plurality of bores 18 extending along lines parallel to the axial dimension of the outer race 12. The bores 18 allow the outer race 12 to be affixed to a hub or sleeve (not shown) which allows for the transfer of torque from the inner race 14 to the hub or sleeve. To facilitate this transfer of torque, the inner race 14 is provided with a keyed inner annular surface 20 for connection to a drive shaft (not shown) or similar driving means. The inner race 14 is also provided with an outer annular contact surface 22.

Figure 4:
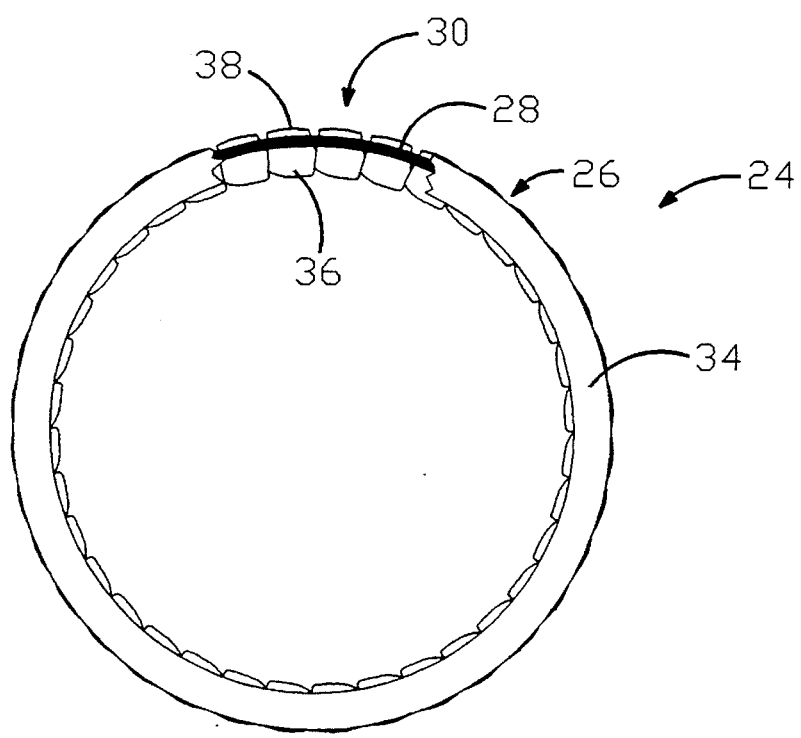
FIG. 4. is a side elevation in partial cross-section of the sprag assembly of FIG. 2.

Provided between the outer race 12 and inner race 14 is a sprag assembly 24 (FIG. 5). As shown in FIGS. 4 and 5, the sprag assembly 24 comprises a sprag retainer 26, a pair of coil springs 28, and a plurality of sprags 30. The sprag retainer 26 is provided with a body 32 and a pair of sidewalls 34. The body 32 is provided with a plurality of openings 35 which allow a portion of the sprags 30 to extend through the sprag retainer 26 and contact the inner annular contact surface 16 of the outer race 12. The sidewalls 34 of the sprag retainer 26 preferably occupy greater than fifty percent of the area between the outer race 12 and the inner race 14. The sidewalls 34, however, do not extend across the full area between the outer race 12 and the inner race 14 so that a lubricant can be injected into the sprag assembly 24 when the overrunning clutch 10 is fully assembled.

As shown in FIG. 4, when the sprag assembly 24 is removed from the overrunning clutch 10, the coil springs 28 bias the sprags 30 into an upright position. When the sprags 30 are in their upright position, however, there is not sufficient distance between the outer race 12 and inner race 14 to insert the sprag assembly 24 therebetween. Accordingly, the sprags 30 must be tilted slightly to allow assembly of the overrunning clutch 10.

The sprags 30 are each preferably provided with a body 36 to contact the outer annular contact surface 22 of the inner race 14, and a head 38 to contact the inner annular contact surface 16 of the outer race 12 (FIGS. 4 and 5). Preferably, the bodies 36 are slightly wider and shorter than both the heads 38 and the openings 35 provided in the sprag retainer 26. Accordingly, the width of the bodies 36 prevents the sprags 30 from falling out of the sprag retainer 26, while the length of the bodies 36 provides sufficient clearance for placement of the coil springs 28 between the bodies 36 and the sidewalls 34. Because the bodies 36 are shorter than the head 38, the coil springs 28 are able to bias the overhanging portion of the heads 38 outward, thereby biasing the sprags 30 into their upright position.

Figure 3:
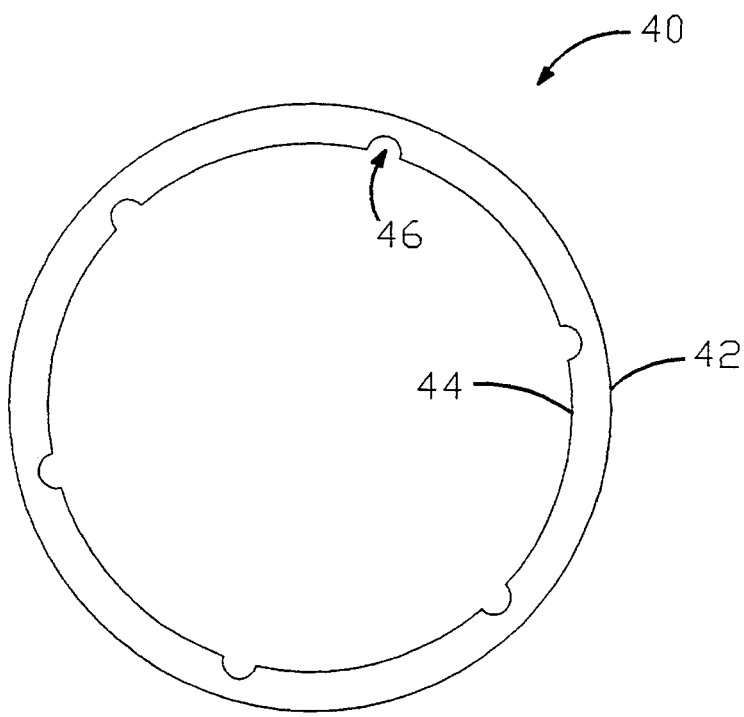
FIG. 3 is a side elevation of the thrust washer of the overrunning clutch of FIG. 1.

The overrunning clutch 10 is also provided with a thrust washer 40 as shown in FIG. 3. The thrust washer 40 is preferably provided with an exterior circumference 42 and an interior circumference 44. Preferably, the diameter of the exterior circumference 42 is only slightly smaller than the diameter of the inner annular contact surface 16 of the outer race 12. This allows the thrust washer 40 to fit between the outer race 12 and inner race 14, while substantially preventing a lubricant (not shown) from escaping between the exterior circumference 42 of the thrust washer 40 and the inner annular contact surface 16 of the outer race 12. Similarly, the diameter of the interior circumference 44 of the thrust washer 40 is slightly larger than the diameter of the outer annular contact surface 22 of the inner race 14 (FIGS. 3 and 5). This allows the thrust washer 40 to be provided over the inner race 14, while substantially preventing the escape of the lubricant between the interior circumference 44 and the outer annular contact surface 22.

Provided along the interior circumference 44 of the thrust washer 40 are a plurality of arcuate slots 46. When the overrunning clutch 10 is assembled, the slots 46 provide an opening for the introduction of the lubricant over the sidewalls 34 of the sprag retainer 26 and into contact with the sprags 30. Although six slots 46 are shown with each having a semi-circular design, any number or design of slots 46 may be used to allow the introduction of a lubricant past the thrust washer 40 and into contact with the sprags 30. While the slots 46 may be either notches or holes, it is important that the slots 46 do not contact or form a part of the exterior circumference 42 of the thrust washer 40. To prevent the inadvertent escape of the lubricant from the overrunning clutch 10 during operation, the slots 46 should be closer to the interior circumference 44 than to the exterior circumference 42. This limitation on slot depth assists in preventing lubricant from being injected into the space between the sidewalls 34 and thrust washer 40, instead of directly into the sprag assembly 24, and also maintains lubricant within the sprag assembly 24 even after the lubricant is ejected from the sprag retainer 26.

Figure 2:
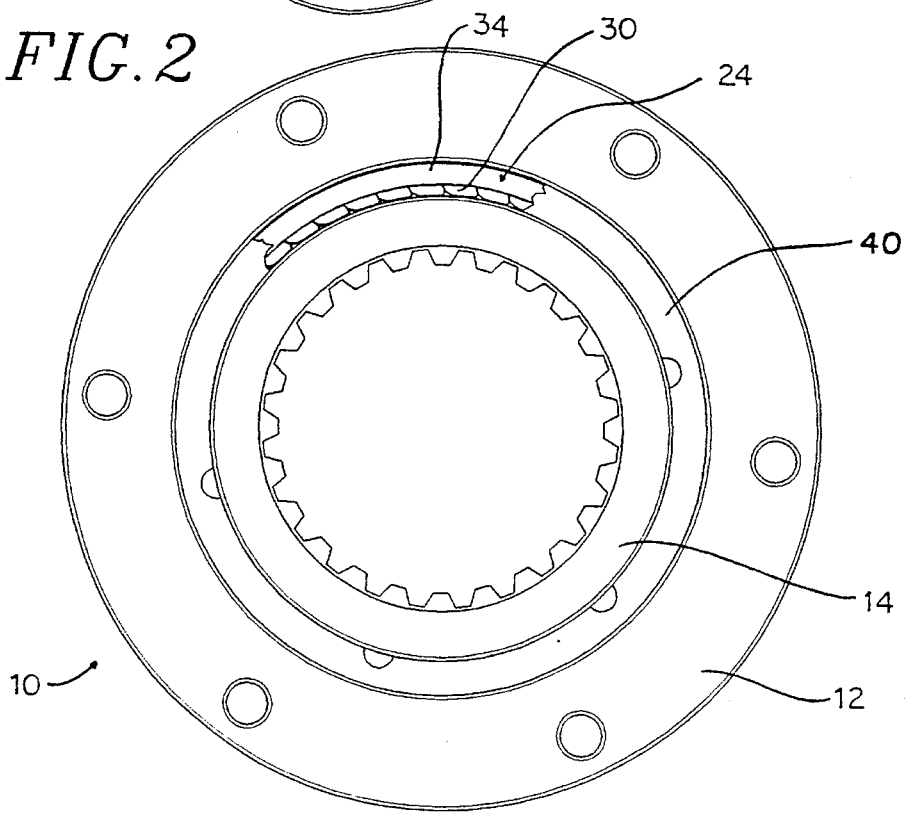
FIG. 2 is a side elevation in partial cross-section showing the overrunning clutch of FIG. 1.

When the overrunning clutch 10 is fully assembled, the sprag assembly 24 is placed within the outer race 12, and the inner race 14 is placed within the sprag assembly 24. The thrust washers 40 are then placed over the sprag assembly 24 between the outer race 12 and the inner race 14. As shown in FIG. 2, when the overrunning clutch 10 is fully assembled, the inner race 14 is allowed to rotate in a first direction (clockwise as shown) relative to the outer race 12, because this rotation tilts the sprags 30 away from their upright position. Conversely, the overrunning clutch 10 prevents rotation of the inner race 14 in the opposite direction (counterclockwise as shown) relative to the outer race 12, as this rotation allows the sprags 30 to tilt toward their upright position, thereby wedging the sprags between the inner race 14 and outer race 12. Accordingly, as the inner race 14 is rotated, torque is transferred to the outer race 12. The coil springs 28 bias the sprags 30 toward their upright position to reduce slippage of the overrunning clutch 10 when rotation is reversed to drive the outer race 12.

To reduce wear on the sprags 30 when the overrunning clutch 10 is in its free or overrunning orientation, lubricant is added through the slots 46, over the sidewalls 34, and into the sprag assembly 24 where centrifugal force throws the lubricant over the sprags 30. The tight tolerances between the sidewalls 34 and inner annular contact surface 16 prevent the escape of the lubricant therebetween, and maintain the lubricant in contact with the sprags 30 to reduce wear and increase the longevity of the sprags 30. Even if a certain quantity of lubricant does escape from the sprag assembly 24, the tight tolerances between the exterior surface 42 of the thrust washer 40 and the interior annular contact surface 16 of the outer race 12 prevent the escape of the lubricant from the overrunning clutch 10. Preferably, the slots 46 of the thrust washer 40, are shallow enough so that as lubricant builds up between the sidewalls 34 and thrust washer 40, the lubricant flows across the sidewalls 34 and back into contact with the sprags 30 before flowing out of the overrunning clutch 10 through the slots 46.

The foregoing description and drawings merely explain and illustrate the invention and the invention is not limited thereto, except insofar as the claims are so limited, as those skilled in the art who have the disclosure before them will be able to make modifications and variations therein without departing from the scope of the invention. For example, it is anticipated that any suitable number and placement of slots 46 may be provided in the thrust washer 40. Additionally, it is anticipated that the sprags may be of a roller type wherein the races are provided with a plurality of spaced apart inclines which wedge the rollers only when the clutch is rotated in a single direction.

What is claimed is:

1. An overrunning clutch comprising:
   (a) an inner race having an outer annular contact surface and a central axis of rotation;
   (b) an outer race having an inner annular contact surface spaced radially from said inner race, said inner annular contact surface and said outer annular contact surface forming an annular space therebetween;
   (c) a plurality of sprags provided in said annular space, said plurality of sprags being of a construction and placement capable of allowing said inner race to rotate in a first direction relative to said outer race, while preventing said inner race from rotating in a second direction relative to said outer race;
   (d) sprag retainer means provided in said annular space for maintaining said plurality of sprags in said annular space; and
   (e) washer means having a circular outer periphery and positioned over said annular space for substantially preventing escape of a lubricant from said annular space between said washer means and said outer race, said washer means being provided with structure which forms an opening to said annular space when said washer means is positioned over said annular space.

2. The overrunning clutch of claim 1, wherein said sprag retainer means is provided with a wall and wherein said wall extends over more than fifty percent of the distance between said inner annular contact surface and said outer annular contact surface, said wall being provided with an opening sized to allow the passage of said lubricant past said wall and into contact with said plurality of sprags, said wall being of a construction and placement which substantially prevents the movement of said lubricant past said wall between said retainer means and said inner annular contact surface of said outer race.

3. The overrunning clutch of claim 1, wherein said washer means is an annular plate having an interior circumference provided with a slot, said interior circumference being positioned close enough to said inner annular contact surface to substantially prevent the escape of said lubricant between said interior circumference and said inner annular contact surface, and wherein said slot is sized to allow the passage of said lubricant past said annular plate and into contact with said plurality of sprags.

4. An overrunning clutch comprising:
   (a) an inner race having an outer annular contact surface and a central axis of rotation;
   (b) an outer race having an inner annular contact surface spaced radially from said inner race, said inner annular contact surface and said outer annular contact surface forming an annular space therebetween;
   (c) unidirectional drive means provided in said annular space for fixing said outer race against rotation relative to said inner race;
   (d) a unidirectional drive means retainer occupying greater than fifty percent of the area between said inner annular contact surface and said outer annular contact surface;
   (e) a washer having an exterior circumference provided with a circular outer periphery and an interior circumference provided with a slot, said washer being positioned in said annular space, with said exterior circumference close enough to said inner annular contact surface to substantially prevent flow of a lubricant between said exterior circumference and said inner annular contact surface, said washer being positioned with said interior circumference close enough to said outer annular contact surface to substantially prevent flow of said lubricant between said interior circumference and said outer annular contact surface, wherein said slot is sized to allow the passage of said lubricant past said washer and into contact with said unidirectional drive means.

* * * * *